(12) United States Patent
Noessing et al.

(10) Patent No.: US 8,995,623 B2
(45) Date of Patent: Mar. 31, 2015

(54) COMMUNICATION LINE TESTING WITH PROTECTIVE DEVICES IN PLACE

(75) Inventors: Gerhard Noessing, Villach (AT); Michael Schoenberger, Poing (DE); Alberto Canella, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 469 days.

(21) Appl. No.: 13/517,598

(22) Filed: Jun. 14, 2012

(65) Prior Publication Data

US 2013/0027055 A1 Jan. 31, 2013

(30) Foreign Application Priority Data

Jul. 27, 2011 (EP) .................................. 11006187

(51) Int. Cl.
| | |
|---|---|
| *H04M 1/24* | (2006.01) |
| *H04M 3/08* | (2006.01) |
| *H04M 3/22* | (2006.01) |
| *H04M 3/18* | (2006.01) |
| *H04M 3/00* | (2006.01) |
| *H04M 3/26* | (2006.01) |

(52) U.S. Cl.
CPC ................ *H04M 3/18* (2013.01); *H04M 3/005* (2013.01); *H04M 3/26* (2013.01)
USPC ................... 379/29.03; 379/27.05; 379/29.04

(58) Field of Classification Search
CPC ..... H04M 1/24; H04M 3/306; H04M 3/2209; H04M 3/30
USPC ............ 379/1.01, 22.07, 26.01, 27.05, 29.03, 379/29.04
See application file for complete search history.

(56) References Cited

U.S. PATENT DOCUMENTS

| | | | |
|---|---|---|---|
| 6,377,435 B1 | 4/2002 | Nabell et al. | |
| 6,870,903 B2 * | 3/2005 | Angliss et al. | ............. 379/27.06 |
| 2003/0112572 A1 * | 6/2003 | Knigge et al. | ................ 361/113 |

FOREIGN PATENT DOCUMENTS

WO    WO 02/096080 A1    11/2002

* cited by examiner

*Primary Examiner* — Quoc D Tran

(57) ABSTRACT

A system and method for testing a transmission line to a protected system includes measuring voltages between a tip-side node of an overcurrent protection device and the protected system, between a ring-side node of the overcurrent protection device and the protected system, between the tip of the transmission line and the protected system, and between the ring of the transmission line and the protected system. Using the measured voltages, the status of the overcurrent protection device and the overvoltage device may be recognized, and the magnitude of a voltage surge on either of the tip and ring wires may be determined.

17 Claims, 3 Drawing Sheets

US 8,995,623 B2

COMMUNICATION LINE TESTING WITH PROTECTIVE DEVICES IN PLACE

RELATED APPLICATIONS

This Application claims priority benefit to European Patent Application 11 00 6187, which was filed on Jul. 27, 2011. The entire contents of the European Patent Application are hereby incorporated herein by reference.

BACKGROUND

In wired communication systems, terminal devices located on the premises of a customer, i.e., subscriber, may be connected to a central office via communication lines. These terminal devices are also known as Customer Premises Equipment (CPE), and examples of such communication systems include plain old telephone system (POTS), PSTN, or xDSL (digital subscriber line) Linecard. Wired communication systems are vulnerable to damage incurred by, e.g., lightning, power contact, generic AC and DC foreign voltages, or surges of different magnitude and duration. Thus, protection of electrical circuits associated with the respective communication systems is of highest concern. In addition, particularly with regard to CPE, protection of the electrical circuits is beholden to safety requirements.

SUMMARY

In one example, a system for testing a transmission line to a protected system includes an overcurrent protection device disposed on tip and ring wires of a transmission line, an overvoltage protection device disposed between the tip and ring wires of the transmission line, and the protected system itself. The protected system includes a measurement unit to measure voltages between a tip-side node of the overcurrent protection device and the protected system, between a ring-side node of the overcurrent protection device and the protected system, between the tip of the transmission line and the protected system, and between the ring of the transmission line and the protected system. Using the measured voltages, the status of the overcurrent protection device and the overvoltage device may be recognized, and the magnitude of a voltage surge on either of the tip and ring wires may be determined.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict plural embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part of the description. Unless otherwise noted, the description of successive drawings may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
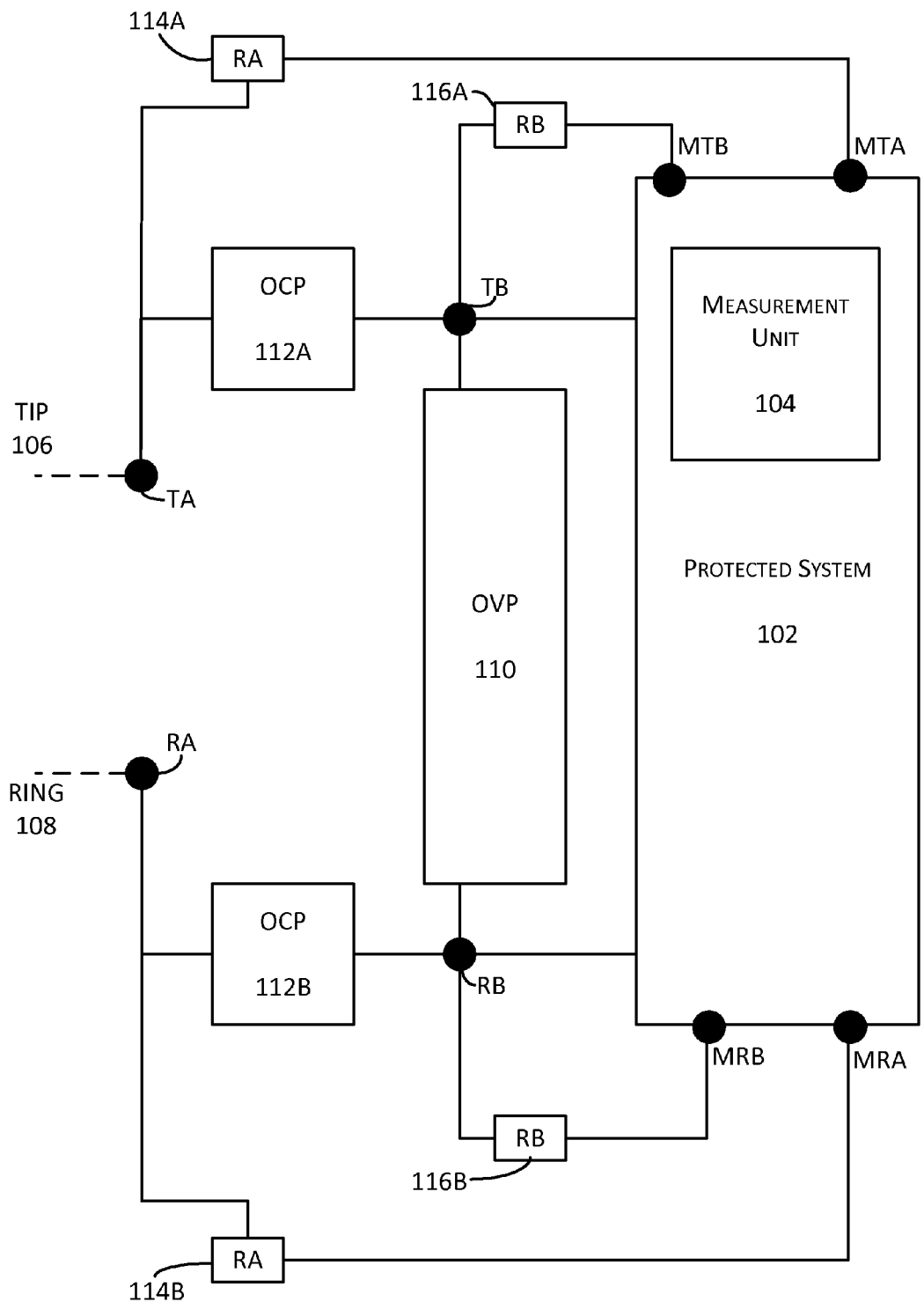
FIG. 1 shows a communication line circuit with an example embodiment of a transmission line testing system integrated therein.

FIG. 1 shows a communication line circuit with an example embodiment of a transmission line testing system 100 integrated therein. Example system embodiment 100 may be a communication system configured as a POTS or xDSL Linecard disposed at a central office, and may include, at least, protected system, i.e., circuitry, 102, measurement unit 104, tip line 106, ring line 108, overvoltage protection device 110, overcurrent protection devices 112A and 112B, and resistances 114A, 114B, 116A, and 116B.

Protected system 102 may include circuitry within a linecard that is to be protected from adverse voltage influences, including but not limited to, voltage surges of varying magnitude and/or duration, foreign AC/DC voltages, lightning, power contacts, etc. Such circuitry, particularly for CPE, requires protection from the aforementioned adverse voltage influences to ensure continued operation and to prevent damage to associated elements.

Measurement unit 104 may be attached or otherwise associated with protected system 102 to monitor the transmission line, including a tip line and a ring line, leading to protected system 102. That is, measurement unit 104 may be internal or external to protected system 102.

Tip line 106 and ring line 108 are configured to be transmission lines, e.g., copper, by which protected system 102 is connected to CPE. It is adverse voltage influences on either or both of tip line 106 and ring line 108 from which protected system 102 is to be protected by the embodiments described herein.

Overvoltage protection device (OVP) 110 and overcurrent protection devices (OCP) 112A and 112B may be regarded as lines of protection from adverse voltage influences for protected system 102. Further, throughout the present description, OCP 112A and OCP 112B may be collectively referred to as "OCP 112," particularly when describing the utility of the devices themselves and, therefore, reference to the individual ones of OCP 112A and OCP 112B is not paramount. Further still, alternative embodiments may include OVP 110 and OCP 112 in varying quantity and configuration, and therefore communication line testing with protective devices in place is not limited to the present depictions and descriptions.

OVP 110 may be configured to include thyristors, gas discharge tubes (GDT), metal oxide varistors (MOV), etc.; however these examples are not intended to be limiting.

OCP 112 may be configured to include positive temperature coefficient thermistors (PTC), fuses, line feed resistors, heat coils, thermal switches, etc.; and, similarly, these examples are also not intended to be limiting.

Resistor RA 114A is configured between tip-side node MTA of protected system 102 and tip line 106, and resistor RA 114B is configured between ring-side node MRA of protected system 102 and ring line 108.

Resistor RB 116A is configured between tip-side node MTB of protected system 102 and a tip-side node TB of OVP 110, and resistor RB 116B is configured between ring-side node MRB of protected system 102 and a ring-side node RB of OVP 110.

Throughout the present description, resistors 114A, 114B, 116A, and 116B may be collectively referred to as "resistors 114" or "resistors 116," respectively, particularly when describing the utility of the resistors themselves and, therefore, reference to the quantity and configuration thereof is not paramount. Further still, alternative embodiments may include resistors 114 and resistors 116 in varying quantity and configuration, and therefore communication line testing with protective devices in place is not limited to the present depictions and descriptions.

Figure 2:
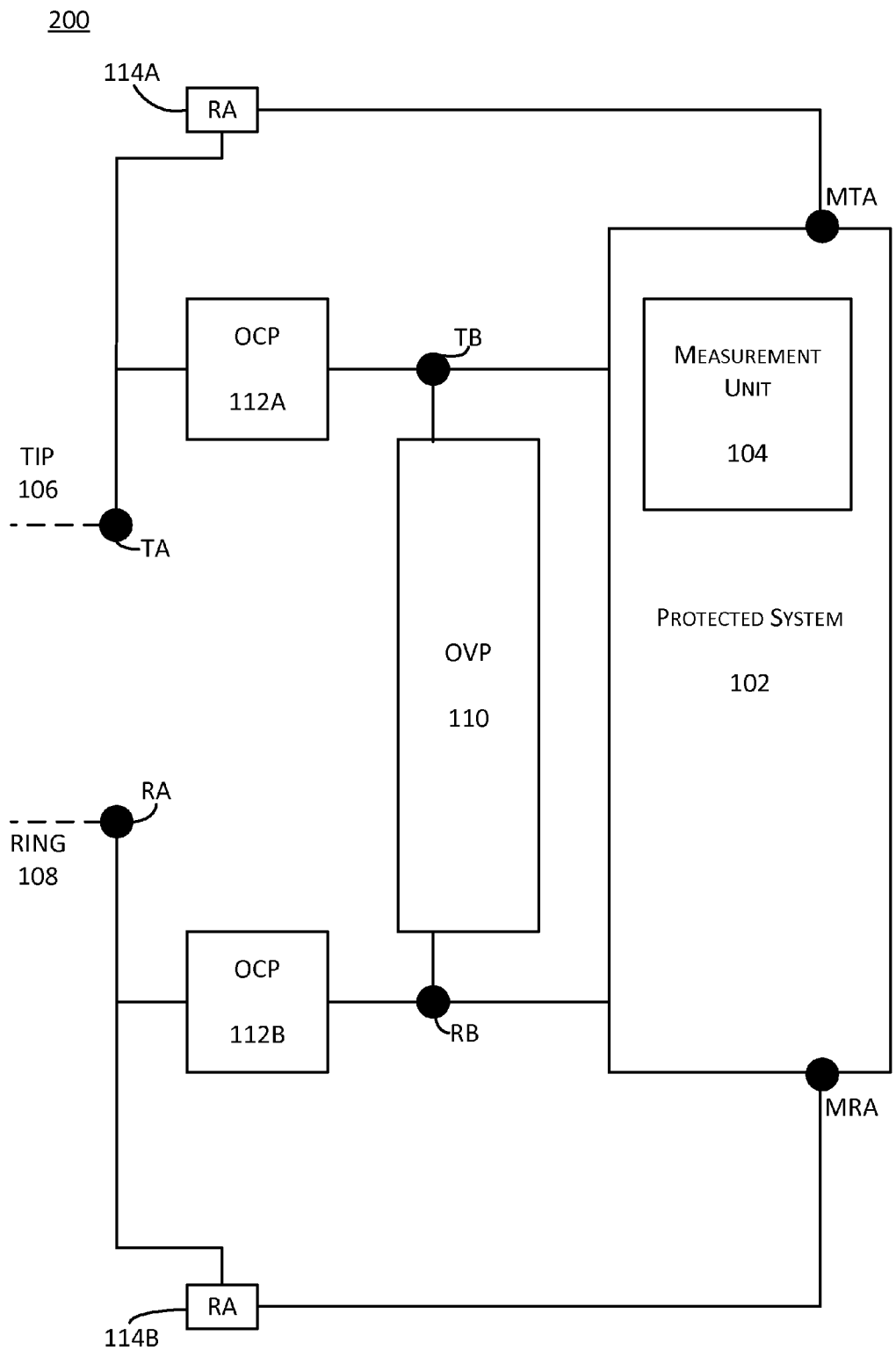
FIG. 2 shows a communication line circuit with another example embodiment of a transmission line testing system integrated therein.

FIG. 2 shows a communication line circuit with another example embodiment 200 of a transmission line testing system integrated therein. Similar to the embodiment of FIG. 1, example embodiment 200 may be a communication system configured as a POTS or xDSL Linecard disposed at a central office, and may include, at least, protected system, i.e., circuitry, 102, measurement unit 104, tip line 106, ring line 108, overvoltage protection device 110, overcurrent protection devices 112A and 112B, and resistances 114A, 114B.

In the example embodiment of FIG. 2, transmission wires from the tip-side node of OVP 110 and OCP 112A to the tip-side node MTB of protected system 102 as well as the ring-side node of OVP 110 and OCP 112B to the ring-side node MRB of protected system 102, as shown in FIG. 1, may be integrated into protected system 102.

Figure 3:
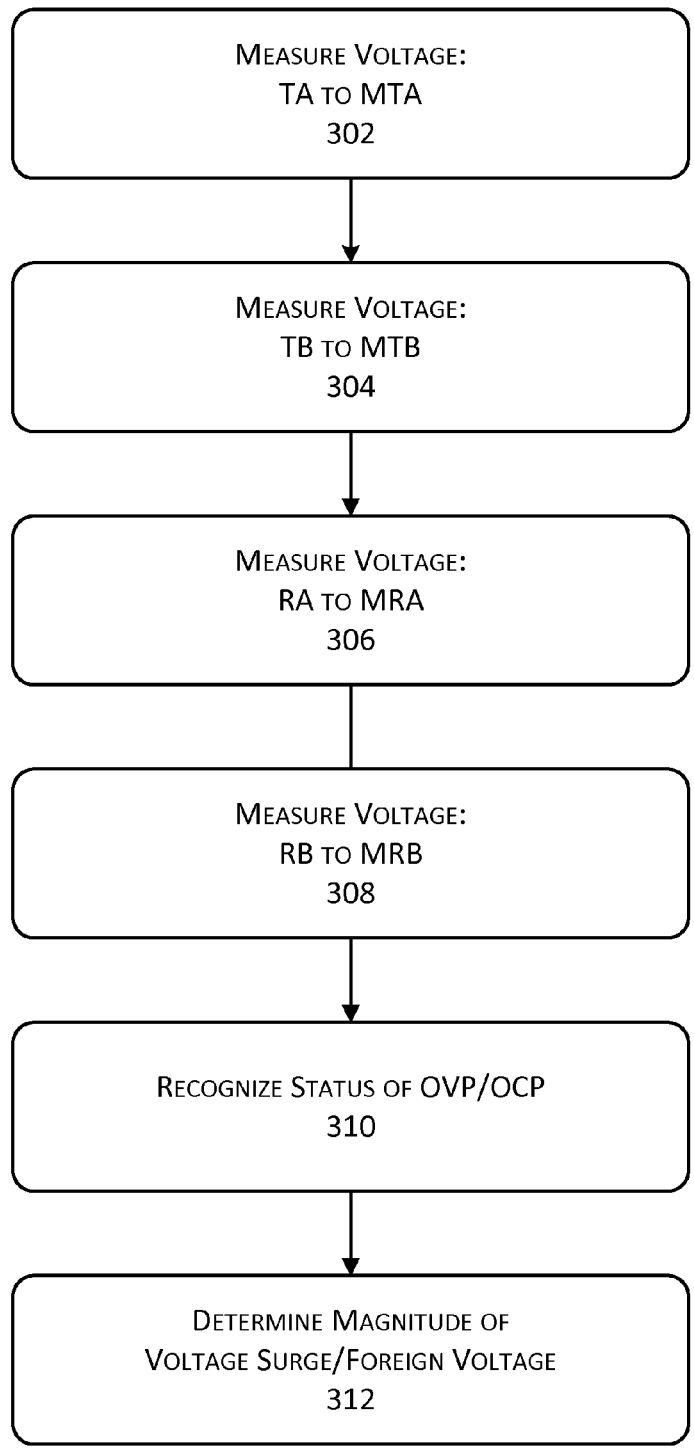
FIG. 3 shows an example processing flow for implementing one or more embodiments of transmission line testing.

FIG. 3 shows an example processing flow 300 for implementing one or more embodiments of transmission line testing. Further, processing flow 300 is described herein with reference to the example embodiment 100 described above with reference to FIG. 1. However, processing flow 300 is not limited to such example configuration, and therefore the present description is not intended to be limiting in any such manner. Further still, example processing flow 300 may include one or more operations, actions, or functions as illustrated by one or more of blocks 302, 304, 306, 308, 310, and/or 312. Although illustrated as discrete blocks, various blocks may be divided into additional blocks, combined into fewer blocks, or even eliminated, depending on a desired implementation. Moreover, the blocks in the FIG. 3 may be operations that can be implemented by hardware, software, or a combination thereof associated with measurement unit 104. Processing may begin at block 302.

Block 302 may include measurement unit 104 monitoring the voltage from tip wire node TA to the tip-side node MTA of protected system 102 for a particular time period.

Block 304 may include measurement unit 104 monitoring the voltage from the tip-side node TB of OVP 110 and OCP 112A to the tip-side node MTB of protected system 102 for the aforementioned particular time period.

Block 306 may include measurement unit 104 monitoring the voltage from ring wire node RA to the ring-side node MRA of protected system 102 for the aforementioned particular period of time.

Block 308 may include measurement 104 monitoring the voltage from ring-side node RB of OVP 110 and OCP 112B to the ring-side node MRB of protected system 102 for the aforementioned particular period of time.

Block 310 may include measurement unit 104 recognizing the status of OVP 110 and OCP 112 based on the voltages monitored at blocks 302, 304, 306, and 308. More particularly, sensing of voltages at tip wire node TA, the tip-side node TB of OVP 110 and OCP 112A, ring wire node RA, and ring-side node RB of OVP 110 and OCP 112B allows the recognition of the status of OVP 110 and OCP based on voltages along voltage measurement paths TA-MTA, TB-MTB, RA-MRA, and RB-MRB.

Statuses recognized by measurement unit 104 may include: a "transparent" condition, by which an adverse voltage influence detected at tip wire node TA and/or ring wire node RA is below a predetermined threshold voltage value that no voltage or current limitation is incurred at either of OVP 110 or OCP 112; a "clipping" condition, by which an adverse voltage influence detected at the tip-side node TB of OVP 110 and OCP 112A and at the ring-side node RB of OVP 110 and OCP 112B are clipped to a predetermined threshold voltage value and, further, no current limitation is incurred at OCP 112; a "switching" condition by which the adverse voltage influence on either of tip wire 106 or ring wire 108 is determined to exceed the predetermined threshold voltage value by such a margin that voltages at tip-side node TB of OVP 110 and OCP 112A and ring-side node RB of OVP 110 and OCP 112B, are grounded and still no current limitation is incurred at OCP 112; and an "open circuit" condition by which the adverse voltage influence on either of tip wire 106 or ring wire 108 is determined to exceed the predetermined threshold current value by such a margin and for a duration exceeding a predetermined time threshold that OCP 112 switches to a higher ohmic state that isolates protected system 102 from transmission lines 106 and 108.

The terms "transparent," "clipping," "switching," and "open circuit," used throughout the present disclosure, are suggestive only and not intended to be limiting terms.

Block 312 may include measurement unit 104 determining a magnitude of an adverse voltage influence including, but not limited to, a voltage surge, foreign voltage, power connection, etc. That is, measurement unit 104 is to determine a magnitude of an adverse voltage influence even when OVP 110 and OCP 112 are actively preventing such adverse voltage influence from affecting transmissions to protected system 102. Accordingly, corrective measures may be taken by hardware, software, firmware, or a combination thereof, at measurement unit 104 or by a monitoring application.

To more particularly describe the operations, actions, or functions in processing flow 300, the following example descriptions are provided. It is emphasized that the values provided in the following descriptions are examples, and are not intended to be limiting of the embodiments of communication line testing with protective devices in place.

For context of the descriptive examples that illustrate measurement of adverse voltage influences on a protection network so that an accurate amplitude of the adverse voltage influence may be determined, mostly for corrective purposes, the following sample values of the features in the example embodiment of FIG. 1 are given:

A 50 Hz sinusoidal adverse voltage Vg may be applied on tip wire 106 through an input resistance Rg of 1000 ohms. It is noted that the processing flow 300 may proceed similarly even if adverse voltage influence is applied on ring wire 108.

Further, in the descriptive examples that follow, it may be assumed that OVP 110 is a dual-voltage thyristor with an upper clipping threshold value of 48V and a lower clipping threshold value of −60V, OCP 112A and 112B are each 36 ohm PTC thermistors, and all resistances 114 and 116 are 1 Mohm.

In a first descriptive example of a "transparent" condition, the voltage $V_{TA}$ at tip wire node TA is substantially equivalent to the voltage $V_{TB}$ at tip-side node TB due to a negligible voltage drop across OCP 112. Similarly, the voltage $V_{RA}$ at ring wire node RA is substantially equivalent to the voltage $V_{RB}$ at ring-side node RB.

Further, in the "transparent" condition, $Vg=V_{TA}(Rg+Zin)/Rg \approx V_{TA}$, wherein Zin is the known input impedance of system 100. Typically, Rg<<Zin, and therefore, for the "transparent" condition $Vg \approx V_{TA}$.

If Rg is not known, $V_{TA}$ may be relied upon as the magnitude of the adverse voltage for the "transparent" condition. Verification of the negligible adverse voltage may be gleaned from measuring the voltage $V_{TB}$ to confirm a negligible voltage drop across OCP 112.

To describe an example of a "clipping" condition, it may be assumed adverse voltage Vg=85V on tip wire 106 and that input resistance Rg=1 Kohm. It may again be assumed in this descriptive example that OVP 110 is a dual-voltage thyristor with an upper clipping threshold value of 48V and a lower clipping threshold value of −60V, OCP 112A and 112B are each 36 ohm PTC thermistors, and all resistances 114 and 116 are 1 Mohm.

Adverse voltage Vg=85V on tip wire 106 clearly exceeds the example upper clipping threshold value of 48V, and therefore $V_{TA}$ may not be measured by measurement unit 104.

$V_{TABPx}$ may be considered the peak-to-peak voltage difference $V_{TA}-V_{TB}$ (or $V_{RA}-V_{RB}$ on the ring side), where "x" denotes a numerical clipping point along the amplitude of $V_{TABP}$. Thus, between the upper and lower clipping threshold values of, e.g., 48V and −60V, $V_{TA} \approx V_{TB}$.

Otherwise, using the measurements gleaned by monitoring at blocks 302, 304, 306, and 308 of processing flow 300, between the first and second clipping points, i.e., positive half-wave, $V_{TABP1}=V_{MTApos}-V_{LIM}1$ wherein $V_{MTApos}$ is the positive peak value at $V_{TA}$; $V_{LIM}1$ is the positive clipping threshold value, e.g., 48V; and between the third and fourth clipping points, i.e., negative half-wave, $V_{TABP2}=V_{TAneg}-V_{LIM}2$, wherein $V_{TAneg}$ is the negative peak value at $V_{TA}$; $V_{LIM}2$ is the negative clipping threshold value, e.g., −60V; and wherein the peak-to-peak value of $V_{TA}-V_{TB}$ is $V_{TABP}=V_{TABP1}-V_{TABP2}=V_{TApos}-V_{LIM}1-V_{TAneg}-V_{LIM}2$.

Accordingly, the peak-to-peak value $V_{TABP}$ enables the magnitude of the adverse voltage Vg to be determined by measurement unit 104 or by an associated monitoring application by:

$$Vg=V_{TABP}*(36\ ohm+Rg)/Rg/2$$

wherein Rg is the coupling resistance that may be measured by measurement unit 104, and 36 ohms is the resistance value of OCP 112, as set forth above for the purpose of the present descriptive examples.

To describe an example of a "switching" condition, it may be assumed that adverse voltage Vg=150V on tip wire 106 and the input resistance Rg=1 Kohm. In this descriptive example OVP 110 is a dual-voltage thyristor with an upper clipping threshold value of 48V and a lower clipping threshold value of −60V, OCP 112A and 112B are each 36 ohm PTC thermistors, and all resistances 114 and 116 are 1 Mohm; and, further, OVP 110 may clamp the adverse voltage at tip wire node TB to ground due to a high adverse voltage and current.

$V_{TABPx}$ may be considered the peak-to-peak voltage difference $V_{TA}-V_{TB}$ (or $V_{RA}-V_{RB}$ on the ring side), where "x" denotes a numerical clipping point along the amplitude of $V_{TABP}$. Thus, between the upper and lower clipping threshold values of, e.g., 48V and −60V, $V_{TA} \approx V_{TB}$.

Again assuming that $V_{MTApos}$ is the positive peak value at $V_{TA}$ and $V_{MTAneg}$ is the negative peak value at $V_{TA}$, and with OVP 110 clamping the adverse voltage at tip wire node TB to ground, the peak-to-peak voltage difference between $V_{TA}$ and $V_{TB}$ may be determined by $V_{TABP}=V_{TApos}-V_{TAneg}$.

$V_{TABP}$ may be measured by measurement unit 104 at ring-side nodes MTA and MTB of protected system 102, and the peak-to-peak value $V_{TABP}$ enables the magnitude of the adverse voltage Vg to be determined by measurement unit 104 or by an associated monitoring application by $Vg=V_{TABP}*(36\ ohm+Rg)/Rg/2$, wherein Rg is the coupling resistance that may be measured by measurement unit 104, and 36 ohms is the resistance value of OCP 112, as set forth above for the purpose of the present descriptive examples.

To describe an example of an "open circuit" condition, it may be assumed that the adverse voltage Vg=230V on tip wire 106, which is of such magnitude that a large enough current is generated on either of tip wire 106 or ring wire 108 so that OCP 112 switches to a high impedance state. Such scenario may occur when, e.g., a power line is inadvertently connected to either of transmission lines 106 or 108. Regardless of the cause, the aforementioned switch to a high impedance state separates protected system 102 from the transmission line.

As a result of the separation of protected system 102 from the transmission line, the voltage at the tip-side node TB of OVP 110 and OCP 112A is negligible. Further, because of the open circuit due to the aforementioned separation, the adverse voltage is not clipped but rather may be accurately measured as $V_{TA}$. That is, $Vg=V_{TA}$.

As a result of the determinations resulting from processing flow 300, corrective measures to counter an adverse voltage influence may be taken by hardware, software, firmware, or a combination thereof, at measurement unit 104 or by a monitoring application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A transmission line testing system, comprising:
   an overcurrent protection device disposed on tip and ring wires of a transmission line;
   an overvoltage protection device disposed between the tip and ring wires of the transmission line; and
   a protected system, including:
   a measurement unit to:
   monitor the transmission line to the protected system by measuring voltages associated with overcurrent protection device and the transmission line,
   recognize a status of the overcurrent protection device and the overvoltage protection device based on the measured voltages, and
   determine a magnitude of a voltage surge on the tip and ring wires of the transmission line based on the measured voltages and the recognized status of the overcurrent protection device and the overvoltage protection device.

2. The transmission line testing system of claim 1, further including:
- a sensing resistor between the tip and the protected system to protect a voltage measurement thereinbetween from the voltage surge on the tip wires of the transmission line;
- a sensing resistor between the tip-side node of the overvoltage protection device and the protected system to protect a voltage measurement thereinbetween from the voltage surge on the tip wires of the transmission line;
- a sensing resistor between the ring and the protected system to protect a voltage measurement thereinbetween from the voltage surge on the ring wires of the transmission line; and
- a sensing resistor between the ring-side node of the overvoltage protection device and the protected system to protect a voltage measurement thereinbetween from the voltage surge on the ring wires of the transmission line.

3. The transmission line testing system of claim 1, wherein the protected system includes a wired transmission system.

4. The transmission line testing system of claim 1, wherein the protected system includes one of a POTS (plain old telephone system) linecard or an xDSL (digital subscriber line) linecard.

5. The transmission line testing system of claim 1, wherein the recognized status includes no voltage surge at either of the overcurrent protection device and the overvoltage protection device.

6. The transmission line testing system of claim 1, wherein the recognized status includes a voltage surge that is limited to a predetermined reference value at both the tip-side node of the overvoltage protection device and the ring-side node of the overvoltage protection device.

7. The transmission line testing system of claim 1, wherein the recognized status includes a voltage surge for which the overvoltage protection device forces the tip-side node of the overvoltage protection device to ground.

8. The transmission line testing system of claim 1, wherein the recognized status includes a voltage surge for which the overvoltage protection device forces the ring-side node of the overvoltage protection device to ground.

9. The transmission line testing system of claim 1, wherein the recognized status includes a voltage surge having an associated current for which the overcurrent protection device isolates the protected system from the transmission line.

10. The transmission line testing system of claim 1, wherein the overcurrent protection device includes one of a positive temperature coefficient thermistor, a fuse, a line feed resistor, a heat coil, or a thermal switch.

11. The transmission line testing system of claim 1, wherein the overvoltage devices includes one of a gas discharge tube, a thyristor, or a metal oxide varistor.

12. The transmission line testing system of claim 1, wherein the measurement unit is to monitor the transmission line to the protected system by measuring voltages between a tip-side node of the overcurrent protection device and the protected system, between a ring-side node of the overcurrent protection device and the protected system, between the tip of the transmission line and the protected system, and between the ring of the transmission line and the protected system.

13. A transmission line testing method, including:
- measuring a voltage between a tip-side node of an overcurrent protection device and a protected communication system;
- measuring a voltage between a ring-side node of the overcurrent protection device and the protected communication system;
- measuring a voltage between a tip of a transmission line and the protected communication system;
- measuring a voltage between a ring of the transmission line and the protected communication system;
- recognizing a status of the overcurrent protection device based on the measured voltages, and
- determining a magnitude of a foreign voltage on the tip and ring wires of the transmission line.

14. The transmission line testing method of claim 13, wherein the recognized status includes no voltage surge at the overcurrent protection device.

15. The transmission line testing method of claim 13, wherein the recognized status includes a voltage surge that is limited to a predetermined reference value at both the tip-side node of a overvoltage protection device and the ring-side node of a overvoltage protection device.

16. The transmission line testing method of claim 13, wherein the recognized status includes a voltage surge for which a overvoltage protection device forces the tip-side node and the ring-side node of a overvoltage protection device to ground.

17. The transmission line testing method of claim 13, wherein the recognized status includes a voltage surge having an associated current for which the overcurrent protection device isolates the protected system from the transmission line.

* * * * *